United States Patent [19]

Diamondis

[11] 4,322,607
[45] Mar. 30, 1982

[54] CAMERA SETTING CALCULATOR FOR UNDERWATER COLOR PHOTOGRAPHY

[76] Inventor: Peter J. Diamondis, 255 Redwood Rd., Merritt Island, Fla. 32952

[21] Appl. No.: 45,221

[22] Filed: Jun. 4, 1979

[51] Int. Cl.³ .............................................. G06C 3/00
[52] U.S. Cl. ................................. 235/64.7; 235/78 R; 235/88 R
[58] Field of Search ............... 235/64.7, 70 A, 84, 235/85 R, 88 R, 78 R-78 RC, 88 F-89 R

[56] References Cited

U.S. PATENT DOCUMENTS

| | | | |
|---|---|---|---|
| 2,284,783 | 6/1942 | Weaver | 235/64.7 |
| 2,299,744 | 10/1942 | Feicht | 235/64.7 |
| 2,445,008 | 7/1948 | Smidt | 235/64.7 |
| 2,517,590 | 8/1950 | Mundorff | 235/85 R |
| 2,767,919 | 10/1956 | Huber | 235/84 |
| 3,908,112 | 9/1975 | Lo et al. | 235/88 R |
| 4,048,477 | 9/1977 | Hungerford | 235/88 R |

*Primary Examiner*—L. T. Hix
*Assistant Examiner*—Benjamin R. Fuller

[57] ABSTRACT

The Camera Setting Calculator for Underwater Color Photography is a manual, mechanical calculator to be used in determining the aperture setting (f-number) of a camera and consisting of two circular sheets of data pivoted to rotate over each other. Rotation of the top piece inputs the given data and displays the appropriate f-number.

11 Claims, 2 Drawing Figures

CAMERA SETTING CALCULATOR FOR UNDERWATER COLOR PHOTOGRAPHY

SUMMARY OF THE INVENTION

This mechanical calculator has been designed to facilitate the task of optimizing camera settings for underwater color photography.

Given the film speed, guide number of the flash unit or type of flash bulb, desired object distance and shutter speed, the calculator can be used to determine the aperture setting (f-number) for optimum exposure.

The calculator consists of two circular plastic cards fastened at the center on which are printed in a polar coordinate arrangement the given data along with experimentally derived exposure data. Rotation of the top piece allows inputting the known data and displaying of the f-number to set the camera.

The shaded areas in both drawings represent areas that are cut out of the pieces.

DETAILED DESCRIPTION OF PREFERRED EMBODIMENT

Figure 1:
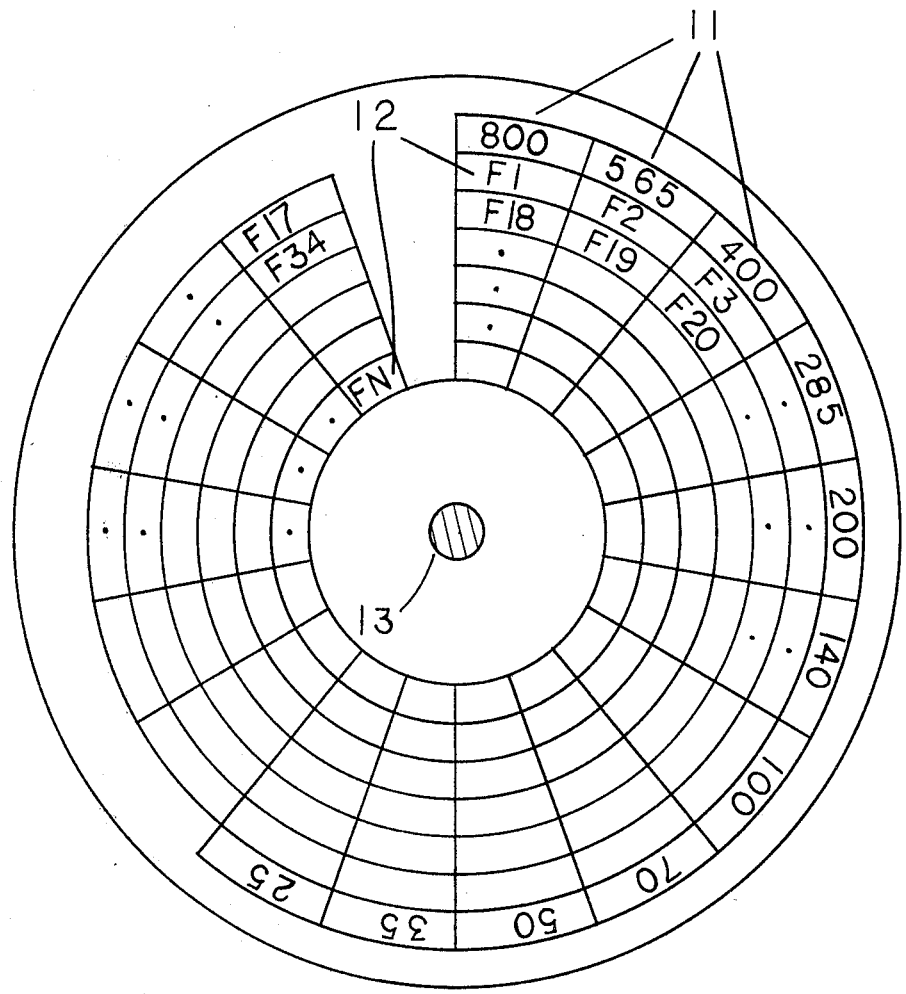
FIG. 1 is the bottom piece of the calculator with the top piece removed.
Figure 2:
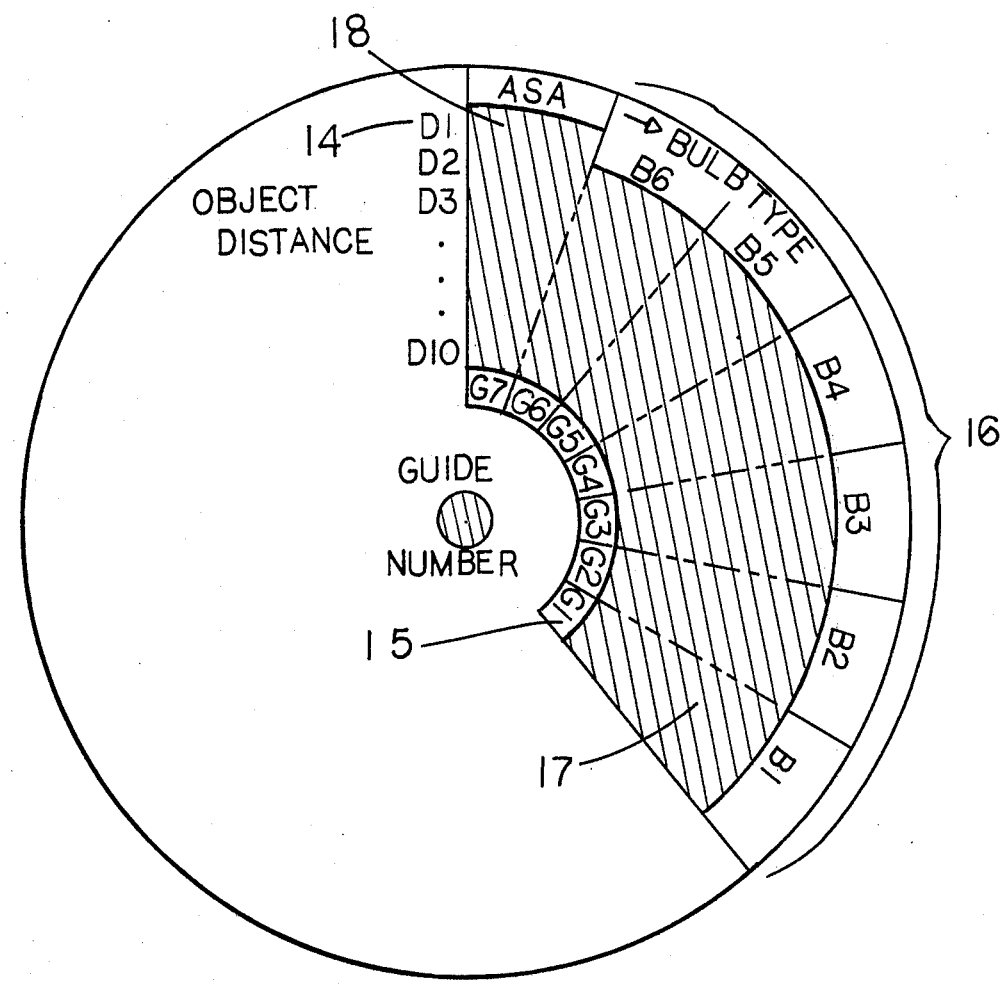
FIG. 2 is the top piece of the calculator that attaches to the bottom piece with a fastener.

The calculator consists of a bottom piece shown in FIG. 1 with a top piece shown in FIG. 2 superimposed and fastened with a gromet type fastener in the center 13 that will allow the top piece to rotate relative to the bottom piece. The bottom piece is essentially a table giving aperture settings in f-numbers 12 labeled F1 through FN for the various film speeds in ASA units and an object distance on polar coordinates. The outer most circle of numbers 11 are the ASA speeds ranging from ASA25 to ASA800 and form one of the coordinates. The other coordinate is along the radius with each concentric circle of f-numbers representing an object distance. These distances 14 are labeled D1 through D10 in FIG. 2.

The top piece (FIG. 2) also contains guide numbers 15 of the flash unit for seven sectors that are of the same angular measure as the sectors of the bottom piece (FIG. 1). A window 17 is cut out of the top piece to show the f-numbers in these sectors of the bottom piece. Equivalent flash bulb types are given in the spaces 16 labeled B1 to B6 when such bulbs exist. The window portion of the top piece also has a cut out 18 for the ASA number of the bottom piece to show through.

In this embodiment the ASA numbers are selected for a useful range of ASA25 to ASA800 and placed in eleven sectors of equal angular measure. The individual numbers are selected as follows: Starting at ASA25 in the 11th sector, the number of the 10th sector is found by multiplying 25 by $\sqrt{2}$ giving 35 (when rounded off to the nearest 5 units). The number for the 9th sector is found by multiplying 35 by $\sqrt{2}$ giving 50. The process is continued until all eleven numbers are generated, i.e., 25, 35, 50, 70, 100, 140, 200, 285, 400, 565 and 800.

The aperture or f-numbers 12 labeled F1 through FN are derived as follows. One set of f-numbers is obtained for one sector with a given ASA number and for distances D1 to D10 experimentally. The clarity of a particular body of water, shutter speed and flash unit will determine the value of this set of f-numbers. The value of f-numbers for the sector immediately to the right will be ½ f-stop smaller and to the left, ½ f-stop larger. Values of f-numbers are thus entered for 17 sectors.

The guide numbers 15 labeled G1 to G7 in FIG. 2 are placed in sectors that are of the same angular measure as the sectors of the bottom piece. One value of the guide numbers is found experimentally and the other values determined by a scheme similar to ASA numbers, i.e., multiplying by $\sqrt[4]{2}$ when going toward the high end of the scale G7 and divide by $\sqrt[4]{2}$ when going toward the lower end of the scale G1. After the guide numbers are derived, the corresponding bulb types 16 may be entered in the spaces labeled B6 to B1 if such exist.

The calculator works as follows. For a given film speed, object distance, flash guide number or bulb type and shutter speed, the aperture setting is determined by: First rotate the top piece to show a number under the ASA label closest to the film speed used. Second, look to the right of the object distance scale for the desired object distance up to the sector appropriate for the flash type used. The number appearing at that point is the proper aperture setting.

The distinguishing features of the Camera Setting Calculator for Underwater Color Photography are embodied in the relationship between the numerical values on the scales and the orientation of said scales relative to the aperture data.

I claim:

1. A film exposure calculator comprising in combination:
    a lower display including thereon quantized aperture values displayed in intersecting radially disposed columns and circumferentially disposed rows, said lower display further including thereon a plurality of film speed values each paired with one of said columns; and
    an upper display movably juxtaposed adjacent said lower display and including:
    (a) a first window therein for displaying one of said film speed values;
    (b) a second window therein for displaying said column of aperture values paired with said film speed value displayed by said first window, with said second window sized for displaying at least five adjacent ones of said columns of aperture values adjacent thereto;
    (c) a column of distance factors radially disposed adjacent said second window in operative registration with adjacent ones of said rows; and
    (d) a row of illumination factors circumferentially disposed adjacent said second window in operative registration with each of said columns,
    whereby the display of a selected one of said film speed values by said first window will operatively space said column of said aperture values adjacent said distance factors and will operatively space said rows of said aperture values adjacent said illumination factors so as to display the correct exposure for the film as a function of distance.

2. The film exposure calculator as described in claim 1 wherein adjacent ones of said film speed values are related to each other by a factor of $\sqrt{2}$.

3. The film exposure calculator as described in claim 2 wherein each of said film speed values is spaced radially adjacent to said aperture value in the outermost one of said rows.

4. The film exposure calculator as described in claim 2 wherein adjacent ones of said illumination factors are related to each other by a factor of $\sqrt[4]{2}$.

5. The film exposure calculator as described in claim 4 wherein each of said illumination factors is expressed as a guide number.

6. The film exposure calculator as described in claim 5 wherein each of said illumination factors is also expressed as a type of flashbulb.

7. The film exposure calculator as described in claim 4 wherein adjacent ones of said aperture values in any given one of said rows are related by a difference of ½ f-stop.

8. The film exposure calculator as described in claim 1 wherein said first window is spaced immediately adjacent to and connecting with said second window.

9. A film exposure calculator comprising in combination:
a lower display including thereon quantized aperture values displayed in intersecting radially disposed columns and circumferentially disposed rows, said lower display further including thereon a plurality of film speed values each paired with one of said columns, adjacent ones of said film speed values being related to each other by a factor of $\sqrt{2}$, with adjacent ones of said aperture values in any given one of said rows being related by a factor of ½ f-stop or a multiple thereof;
an upper display movably juxtaposed adjacent said lower display and including:
(a) a first window therein for displaying one of the film speed values;
(b) a second window therein for displaying said column of aperture values paired with said film speed value displayed by said first window with said second window sized for displaying at least five adjacent ones of said columns of aperture values adjacent thereto;
(c) a column of distance factors radially disposed adjacent said second window in operative registration with adjacent ones of said rows; and
(d) a row of illumination factors circumferentially disposed adjacent said second window in operative registration with each of said columns, with adjacent ones of said illumination factors being related to each other by a factor of $\sqrt[4]{2}$;
whereby the display of a selected one of said film speed values by said first window will operatively space said column of said aperture values adjacent said distance factors and will operatively space said rows of said aperture values adjacent said illumination factors so as to display the correct exposure for the film as a function of distance.

10. The film exposure calculator as described in claim 9 wherein said first window is spaced immediately adjacent to and connecting with said second window.

11. The film exposure calculator as described in claim 9 wherein each of said film speed values is spaced radially adjacent to said aperture values in the outermost one of said rows.

* * * * *